United States Patent
Shulman et al.

(10) Patent No.: US 7,640,235 B2
(45) Date of Patent: Dec. 29, 2009

(54) SYSTEM AND METHOD FOR CORRELATING BETWEEN HTTP REQUESTS AND SQL QUERIES

(75) Inventors: Amichai Shulman, Givataim (IL); Michael Boodaei, Givataim (IL); Shlomo Kremer, Tel-Aviv (IL)

(73) Assignee: Imperva, Inc., Foster City, CA (US)

( * ) Notice: Subject to any disclaimer, the term of this patent is extended or adjusted under 35 U.S.C. 154(b) by 598 days.

(21) Appl. No.: 11/609,662

(22) Filed: Dec. 12, 2006

(65) Prior Publication Data

US 2007/0136312 A1    Jun. 14, 2007

Related U.S. Application Data

(60) Provisional application No. 60/749,066, filed on Dec. 12, 2005.

(51) Int. Cl.
*G06F 17/30* (2006.01)

(52) U.S. Cl. .............................. 707/3; 707/10; 709/203

(58) Field of Classification Search ................. 707/3–5, 707/10; 709/203
See application file for complete search history.

(56) References Cited

U.S. PATENT DOCUMENTS

| | | | |
|---|---|---|---|
| 6,266,666 B1 | 7/2001 | Ireland | |
| 6,584,569 B2 | 6/2003 | Reshef | |
| 6,826,698 B1 | 11/2004 | Minkin | |
| 6,850,893 B2 | 2/2005 | Lipkin | |
| 2004/0153459 A1* | 8/2004 | Whitten et al. | ................ 707/10 |
| 2006/0265430 A1* | 11/2006 | Manin | ........................ 707/201 |

* cited by examiner

*Primary Examiner*—Cheryl Lewis
(74) *Attorney, Agent, or Firm*—Sughrue Mion, PLLC

(57) ABSTRACT

The system and method correlate between hypertext transfer protocol (HTTP) requests and structured query language (SQL) queries. The system operates in two modes: learn mode and protect mode. In the learn mode, the system identifies pairs of uniform resource locators (URLs) and SQL templates, in addition to, pairs of correlation parameters and SQL queries. In the protect mode, for each incoming SQL query, the system binds to each submitted SQL query a session identifier (sessionID) of a corresponding HTTP request and the user identity of the user that submitted the query.

25 Claims, 5 Drawing Sheets

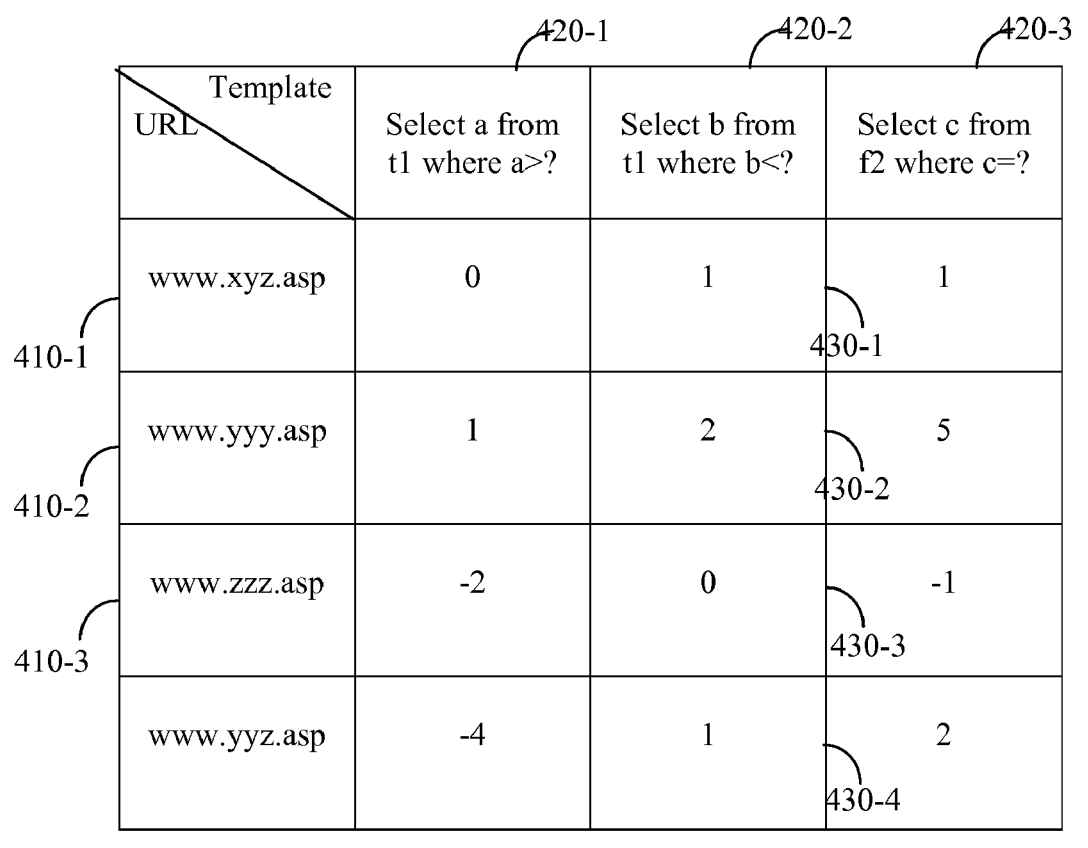

| Template URL | Select a from t1 where a>? | Select b from t1 where b<? | Select c from f2 where c=? |
|---|---|---|---|
| www.xyz.asp | 0 | 1 | 1 |
| www.yyy.asp | 1 | 2 | 5 |
| www.zzz.asp | -2 | 0 | -1 |
| www.yyz.asp | -4 | 1 | 2 |

FIG. 4

SYSTEM AND METHOD FOR CORRELATING BETWEEN HTTP REQUESTS AND SQL QUERIES

CROSS REFERENCE TO RELATED APPLICATIONS

This application claims priority from U.S. provisional application No. 60/749,066 filed on Dec. 12, 2005 which is incorporated by reference, herein, in its entirety.

TECHNICAL FIELD

The present invention relates generally to application level security systems, and more particularity to a method for the correlation between Hypertext Transfer Protocol (HTTP) and structured query language (SQL) queries.

BACKGROUND OF THE INVENTION

The accessibility and convenience of the Internet rapidly changed the way people access information. The World Wide Web ("WWW"), usually referred to as "the web", is the most popular means for retrieving information on the Internet. The web gives users access to practically an infinite number of resources, such as interlinked hypertext documents accessed by, for example, a hyper text transfer protocol (HTTP) from servers located around the world.

Enterprises and organizations expose their business information and functionality on the web through software applications, usually referred to as "web applications". The web applications use the Internet technologies and infrastructures. A typical web application uses a backend database to store application data. The backend database is accessed through some proprietary network protocol carrying Structured Query Language commands.

The web applications provide great opportunities for an organization. However, at the same time these applications are vulnerable to attack from malicious, irresponsible, or criminally minded individuals. In the related art, an effective protection of web applications is achieved by means of application level security systems. Such systems prevent attacks by restricting the network level access to the web applications, based on the applications' attributes. Specifically, the security systems constantly monitor requests received at interfaces and application components, gather application requests from these interfaces, correlate the application requests, and match them against predetermined application profiles. These profiles include attributes that determine the normal behavior of the protected application. If one or more application requests do not match the application profile, an irregular event is generated, and then an alert indicating a potential attack is produced.

Typically, web applications use a backend database and a single application account to access the database. Consequently, any web oriented or database oriented security mechanism is not able to correctly establish the web application context (e.g., a URL, a sessionID, or a UserID) in which a request to the database is made. There are numerous consequences to this inability. First, regulatory requirements demand that any access to sensitive information in the database must be attributed to a single actual user. Complying with these regulations is impossible given separate web and database security mechanisms. This should not be viewed as merely a regulatory burden. The ability to correlate any database access with a specific user is crucial for pinpointing an attacker either in real-time or during forensic analysis. Moreover, the number of false alarms issued on SQL injection attacks by such systems is relatively high. As for another example, the security systems cannot provide information about users who made changes to the database.

SUMMARY OF THE INVENTION

Among others, therefore, it is one object of the invention to provide a solution that allows application level security systems to correlate HTTP requests to SQL queries.

The invention is taught below by way of various specific exemplary embodiments explained in detail, and illustrated in the enclosed drawing figures.

BRIEF DESCRIPTION OF THE DRAWINGS

The drawing figures depict, in highly simplified schematic form, embodiments reflecting the principles of the invention. Many items and details that will be readily understood by one familiar with this field have been omitted so as to avoid obscuring the invention.

FIG. 4 is an exemplary URL-Template matrix.

DETAILED DESCRIPTION OF THE INVENTION

The invention will now be taught using various exemplary embodiments. The intended audience for the following discussion is the person already familiar with this field. Although the embodiments are described in detail, it will be appreciated that the invention is not limited to just these embodiments, but has a scope that is significantly broader. The appended claims should be consulted to determine the true scope of the invention.

Figure 1:
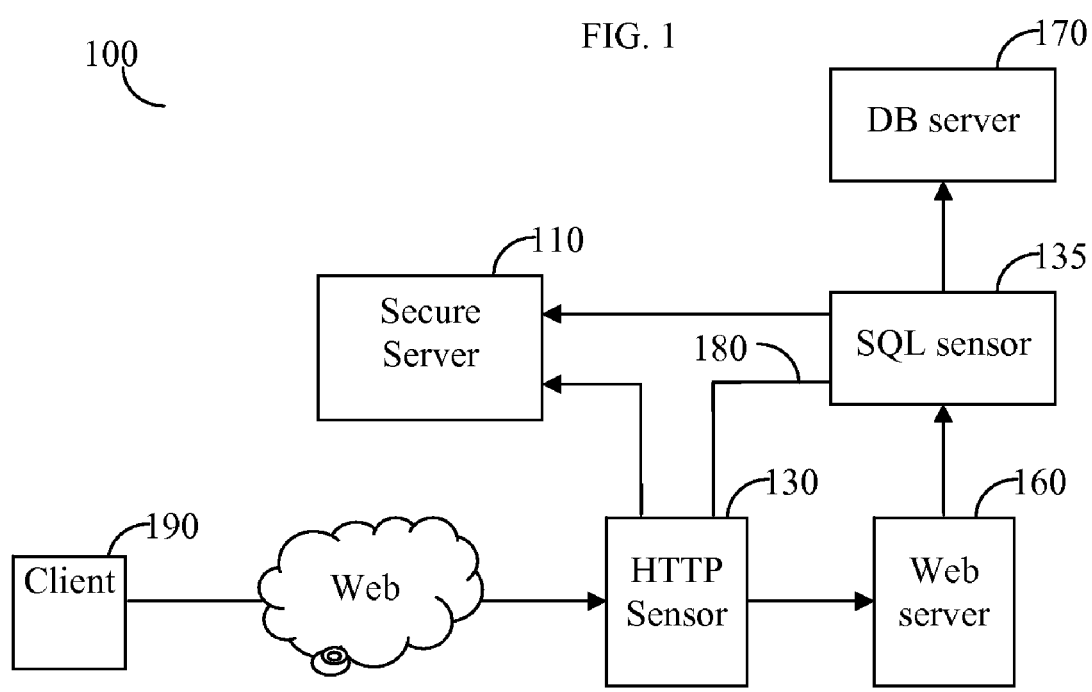
FIG. 1 is a diagram of an application level security system that discloses one embodiment of the present invention.

FIG. 1 shows an exemplary diagram of an application level security system 100 that discloses one embodiment of the present invention. Security system 100 correlates HTTP requests to SQL queries for the purpose of providing enhanced protection features. These features may include, but are not limited to, the generating of databases' audit reports, creating access profile of tables in databases, improving the detection of SQL injection attacks, and so on. Security system 100 includes a HTTP sensor 130 and a SQL sensor 135 connected to a secure server 110. Sensors 130 and 135 may be connected to server 110 through out-of-band network (not shown) for transferring traffic over a dedicated and secure network that is completely separated from the production traffic.

HTTP sensor 130 is placed on a network segment between a client 190 and a web server 160 to be protected. Sensor 130 collects and analyzes HTTP requests sent from a client 190 to web server 160. SQL sensor 135 is placed on a network segment between web server 160 and a database (DB) server 170 and designed to collect and analyze SQL queries sent from web server 160 to DB server 170. The sensors 130 and 135 communicate with each other using a dedicated link 180 for transferring data that is used for the correlation. For example, the two sensors can share URLs, pending SQL queries, pending HTTP requests, correlation parameters, and so on. Security system 100 is a non-intrusive system, and thus each of sensors 130 and 135 allows traffic passing directly through the HTTP sensor 130 to the protected web server 160 and through SQL sensor 135 to DB server 170. It should be noted that security system 100 may include a plurality of HTTP and SQL sensors connected to a plurality of web and DB servers to be protected. It should be further noted that in some embodiments the HTTP and SQL sensors may be integrated in a single device.

Security system 100 operates in two modes: learn mode and protect mode. In learn mode, security system 100 monitors and learns the normal behavior of users and applications over time, and builds normal behavior profiles (NBPs) for each protected application. Specifically, during the learning period, security system 100 finds relations between URLs and SQL templates. In addition, system 100 discovers, for each URL, a set of parameters (hereinafter "correlation parameters") that may impact the SQL queries. In accordance with the present invention, a SQL template is a SQL query statement where at least literals are replaced with, for example, question marks '?' and comments and white-space characters are replaced by, for example, a single space character. As an example, for the SQL query statement:

"select a /* just a comment */ from table_1 where a>6"

the SQL template is:
"select a from table_1 where a>?".

The process for correlating HTTP and SQL requests during a learning period is performed by secure server 110 and will be described in detail below. Once, secure server 110 acquires sufficient information to start protecting the application, the information is added to NBPs and uploaded to sensors 130 and 135. There are two types of NBPs: the HTTP NBP that is kept in HTTP sensor 130 and its characteristics include, but are not limited to, URLs, a hostname or a group hostnames to which a designated URL belongs, a HTTP method by which a designated URL is called, occurrence, cookies sent to the client, URL patterns, URL parameters and the constraints of each parameter, HTTP response code, and others; and, the SQL NBP that is maintained by SQL sensor 135 and its characteristics include, but are not limited to, SQL query statements used by a Web application to access the database, a list of IP addresses that are allowed to generate each specific query, database usernames used to invoke each query, and others. In accordance with an embodiment of the invention, both HTTP and SQL NBPs include pairs of correlated URLs and SQL templates, and for each such URL, a list of correlation parameters.

In protect mode, to each SQL query submitted by the user, security system 100 binds a session identifier (sessionID) of the respective HTTP request. Alternatively or collectively, system 100 may bind the user identity (UserID) of the actual user who submitted the query. Using this information, security system 100 may generate a plurality of reports. For example, one report may include information on tables in DB server 170 that require authentication, another report may include records on changes made to DB server 170 and by whom, and others. The operation of security system 100 during the protect mode will be described in greater detail below.

It should be appreciated by a person skilled in the art that the correlation is performed on-line, i.e., as traffic is sent from client 190. It should be further appreciated that the correlation is performed without installing agents in neither web server 160 nor DB server 170. Specifically, the ability to correctly establish a web application context in which a request to the database is performed without modifying DB server 170 or the protected web application. This is opposed to prior art solutions which demand to re-program the web application in order to associate submitted query with, for example, a UserID.

Figure 2:
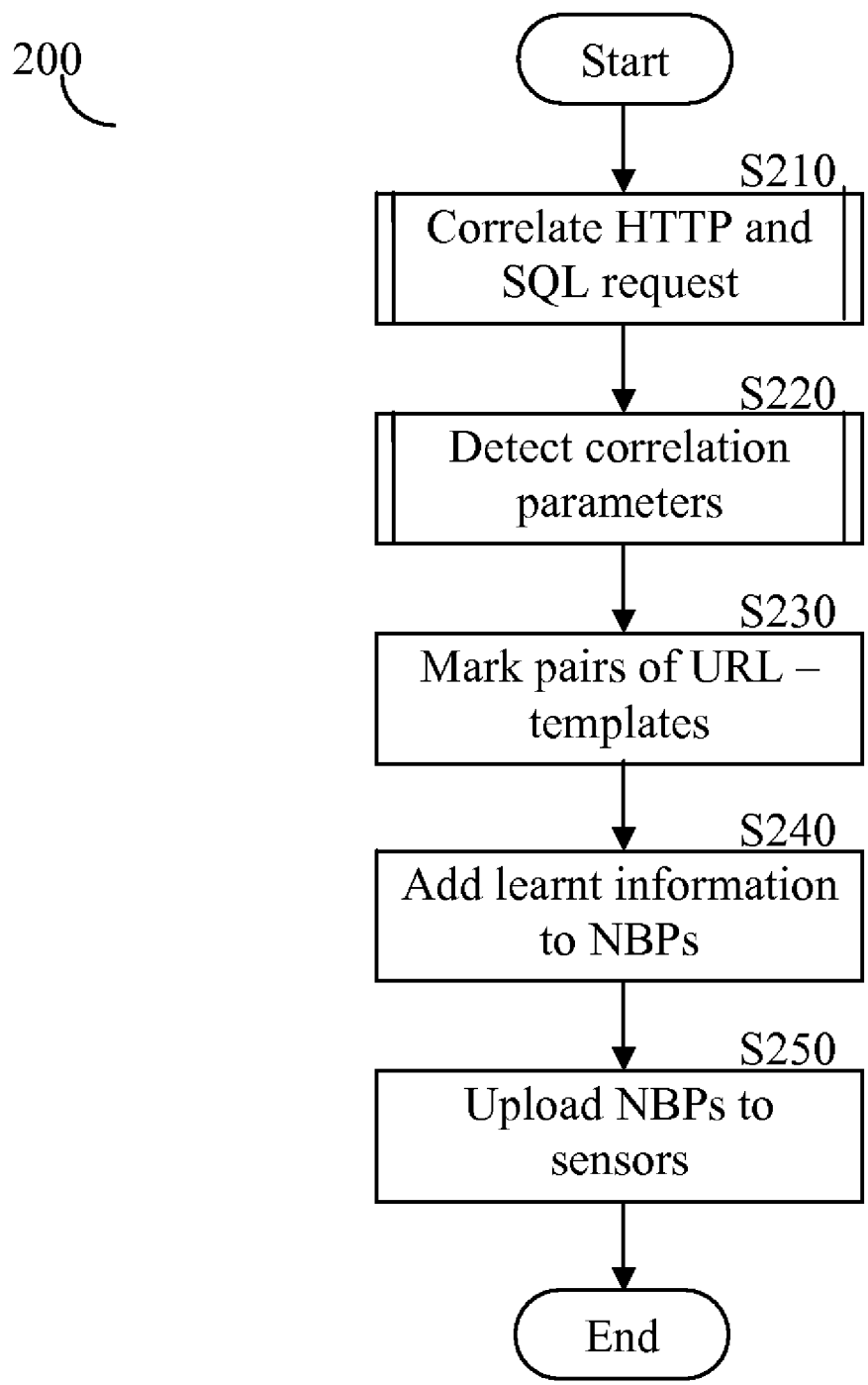
FIG. 2 is a flowchart describing the method for identifying correlations of HTTP and SQL requests that discloses one embodiment of the present invention.

FIG. 2 shows an exemplary and non-limiting flowchart 200 describing method for learning the correlativity of HTTP requests and SQL queries in accordance with one embodiment of the present invention. At S210, a process for correlating between URLs and SQL templates is applied.

Figure 3:
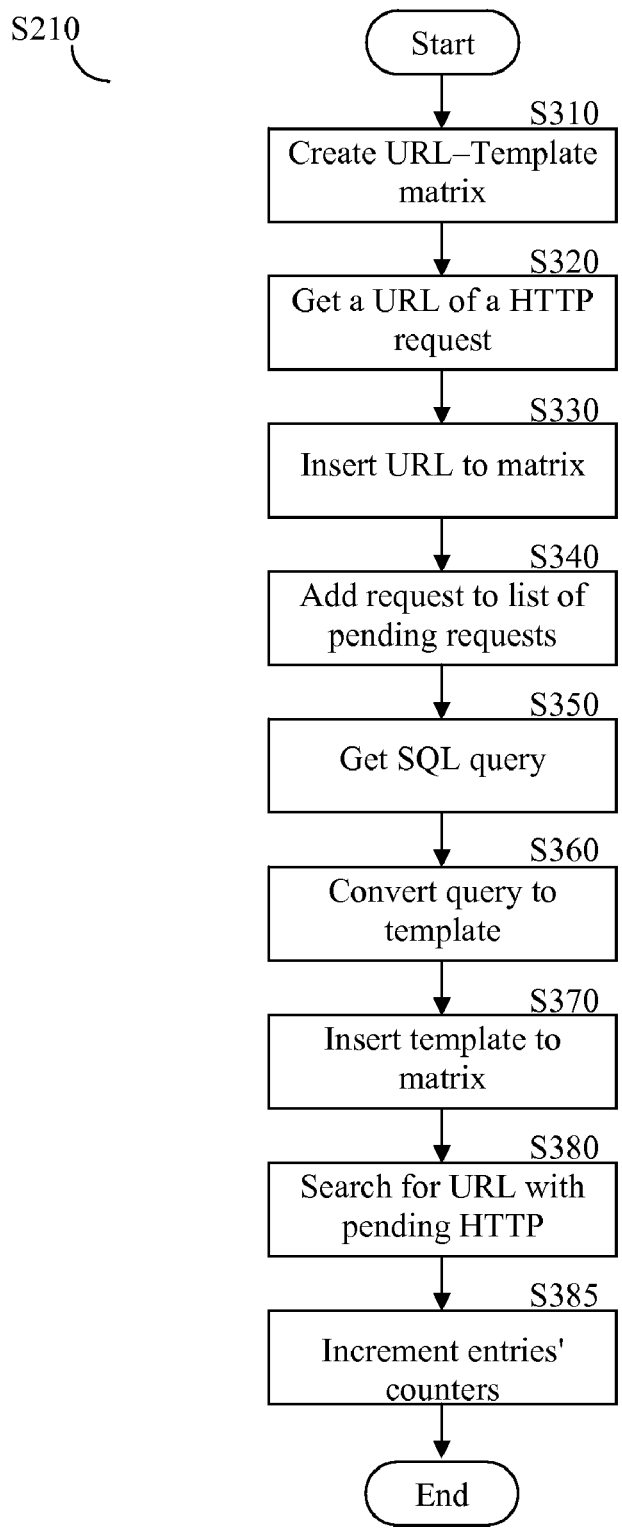
FIG. 3 is a flowchart describing the process for correlating URLs and SQL templates that discloses one embodiment of the present invention.

FIG. 3 shows the operation of S210 in greater detail. At S310, a matrix (hereinafter "URL-Template matrix") having M columns and N rows is created. Each row and column in the URL-Template matrix respectively represents a URL of a HTTP request and a SQL template extracted from a SQL query statement. The size of the URL-Template matrix dynamically changes according to the number of observed URLs and SQL templates. Each entry in the URL-Template matrix holds a counter that can be incremented by a fixed value. The counters are initialized with a zero value. At S320, a HTTP request is captured by the HTTP sensor and the URL is extracted from this request. Then, at S330, the URL is inserted to the URL-Template matrix to an entry in the first available row and first column. At S340, the captured HTTP request is added to a list of pending requests for this URL. That is, for each URL in the URL-Template matrix, system 100 maintains a list of pending requests. At S350, a SQL query statement is captured by the SQL sensor and, at S360, the statement is converted to a SQL template. Namely, each literal in the SQL query statement is replaced with a place holder (e.g., a question mark) and comments and white-space characters are removed. At S370, the SQL template is inserted to the URL-Template matrix to an entry in the first available column and the first row. At S380, the method searches for URLs in the URL-Template matrix that have at least one pending HTTP request, and at S385 for each such URL the counter in the respective entry is incremented. FIG. 4 shows a non-limiting example of a URL-Template matrix that includes four URLs 410 and three SQL templates 420. SQL template 420-2 currently being processed and URLs 410-1 and 420-3 having pending HTTP requests. Hence, the counters of entries 430-1 and 430-3 are incremented and the counters of entries 430-2 and 430-4 are decremented.

Referring back to FIG. 2, where at S 220 a process for finding correlation parameters may be applied. A correlation parameter is a parameter that is part of a HTTP request and may imply on a literal in a SQL query. For example, the URL for a search operation in an application is "search.asp". It accepts "query" as a parameter, thus a HTTP request to search for pages with the word "computers" would be:

http://www.mysite.com/search.asp?query=computers.

The actual query statement produced for this request is:

select page_id from page_keywords where keyword like '%computers%'.

Identified correlation parameters may be added to the HTTP and SQL NBPs.

At S230 entries in the URL-Template matrix having values that are above a predefined threshold are marked. The threshold is set to a number of observations that is considerably higher than the expected number of random observations. The expected number of random observations is determined based on the total number of occurrences for each query template and the total system time that each URL is observed. At S240, all marked pairs of URLs and SQL templates are added to the HTTP and SQL NBPs. At S250, upon decision of secure server 110 the HTTP NBP and SQL NBP are respectively uploaded to the HTTP sensor 130 and SQL sensor 135.

Figure 5:
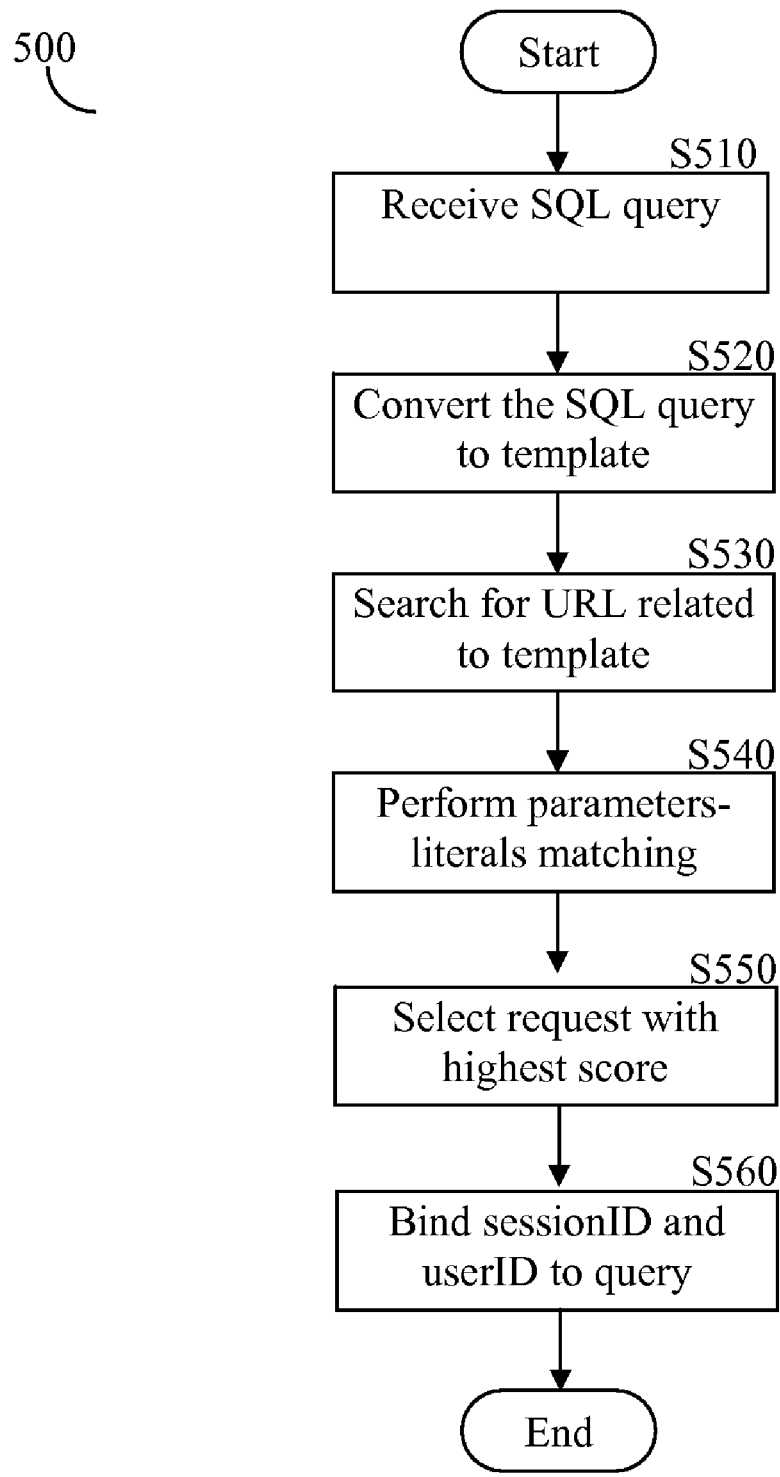
FIG. 5 is a flowchart describing the process applied during the protect mode that discloses one embodiment of the present invention.

FIG. 5 shows an exemplary and non-limiting flowchart 500 describing the operation during the protect mode that discloses one embodiment of the present invention. In this mode, security system 100 associates each SQL query with the sessionID and preferably with the user identity of the actual user. At S510, a SQL query is received at the SQL sensor and, at S520, this query is converted to a SQL template. At S530, the SQL sensor searches in its NBP for URLs that relate to the template. At S540, for each HTTP request with a URL that is correlated to the SQL template a parameters to literals matching is performed. For example, for the HTTP request shown above the value of the "query" parameter, i.e., "computers" is matched to the actual query. The outcome of the matching operation is a score given to each HTTP request based on the number of matches between parameters' values in the request and literals in the SQL query. At S550, the HTTP request with the highest score is selected and at S560, the method binds the sessionID of the request and UserID of the actual user that submitted the request to the incoming SQL query.

Many variations to the above-identified embodiments are possible without departing from the scope and spirit of the invention. Possible variations have been presented throughout the foregoing discussion. Moreover, it will be appreciated that, in an embodiment of the invention, the UserID may be detected using one or more of the techniques disclosed in U.S. application Ser. No. 11/563,589 entitled "Techniques for Tracking Actual Users in Web Application Security Systems" and filed on Nov. 27, 2006 assigned to the common assignee and hereby incorporated by reference in its entirety, especially so much of the disclosure that describes detecting the UserID or equivalent.

Combinations, subcombinations, and variations of the various embodiments described above will occur to those familiar with this field, and may safely be made without departing from the scope and spirit of the invention.

There is claimed:

1. A method for real-time correlating between requests to a web server and requests to a database server, comprising:
   identifying correlated pairs of structured query language (SQL) templates and uniform resource locators (URLs);
   for each incoming request to the database server, binding a web application context in which the request to the database server is made;
   wherein identifying the correlated pairs of SQL templates and URLs, further comprises:
   creating a first matrix, wherein each row of the first matrix represents a URL and each column represents a SQL template and wherein each entry in the first matrix includes a counter;
   extracting the URL from an incoming HTTP request;
   inserting the URL to an available row in the first matrix;
   adding the incoming HTTP request to a list of pending HTTP requests for the URL;
   converting an incoming SQL query to a SQL template;
   inserting the SQL template to an available column in the first matrix; incrementing the counter of each entry of a respective URL that has at least one pending HTTP request; and marking all entries in the first matrix having a counter's value greater than a predefined threshold.

2. The method of claim 1, wherein requests to web servers are hypertext transfer protocol (HTTP) requests and wherein requests to database server are SQL queries.

3. The method of claim 2, wherein binding the web application context, to the SQL query, further comprises:
   receiving a SQL query;
   converting the SQL query to a SQL template;
   searching in a SQL NBP for URLs that correlate to the SQL template;
   for HTTP request with a correlated URL,
      matching between parameters of the HTTP request and literals of the SQL query;
      computing a matching score for each HTTP request;
      selecting the HTTP request with the highest correlate score; and
      binding the web context web application context of the selected HTTP request to the incoming SQL query.

4. The method of claim 3, wherein the web application context includes at least one of: a session identifier (sessionID), and a user identity.

5. The method of claim 1, wherein the threshold is set to a number higher than an expected number of random observations for each pair of URL and query template.

6. The method of claim 5, wherein the expected number of random observations is determined based on the total number of occurrences for each query template and the total system time that each URL is observed.

7. The method of claim 1, further comprising adding pairs of SQL templates and URLs of marked entries of the first matrix to normal behavior profiles (NBPs).

8. The method of claim 7, wherein the NBPs include a SQL NBP and a HTTP NBP.

9. The method of claim 1, wherein converting the incoming SQL query to the SQL template comprises:
   replacing each literal in the SQL query with a place holder;
   removing comments in the SQL query; and
   removing white-space characters in the SQL query.

10. A computer program product including software instructions stored on a computer-readable medium, adapted to enable a computer to perform a routine for real-time correlating between requests to a web server and requests to a database server, the routing comprising:
    identifying correlated pairs of structured query language (SQL) templates and uniform resource locators (URLs);
    for each incoming request to the database server binding a web application context in which the request to the database server is made;
    wherein identifying the correlated pairs of SQL templates and URLs, further comprises:
    creating a first matrix, wherein each row of the first matrix represents a URL and each column represents a SQL template and wherein each entry in the first matrix includes a counter;
    extracting the URL from an incoming HTTP request;
    inserting the URL to an available row in the first matrix;
    adding the incoming HTTP request to a list of pending HTTP requests for the URL;
    converting an incoming SQL query to a SQL template;
    inserting the SQL template to an available column in the first matrix; and
    incrementing the counter of each entry of a respective URL that has at least one pending HTTP request; and marking all entries in the first matrix having a counter's value greater than a predefined threshold.

11. The computer program product of claim 10, wherein requests to web servers are hypertext transfer protocol (HTTP) requests and wherein requests to database server are SQL queries.

12. The computer program product of claim 10, wherein the threshold is set to a number higher than an expected number of random observations for each pair of URL and query template.

13. The computer program product of claim 10, wherein the expected number of random observations is determined based on the total number of occurrences for each query template and the total system time that each URL is observed.

14. The computer program product of claim 10, further comprises adding pairs of SQL templates and URLs of marked entries of the first matrix to normal behavior profiles (NBPs).

15. The computer program product of claim 14, wherein the NBPs include a SQL NBP and a HTTP NBP.

16. The computer program product of claim 10, wherein converting the incoming SQL query to the SQL template comprises:
  replacing each literal in the SQL query with a place holder;
  removing comments in the SQL query; and
  removing white-space characters in the SQL query.

17. The computer program product of claim 16, wherein binding the web application context to the SQL query, further comprises:
  receiving a SQL query;
  converting the SQL query to a SQL template;
  searching in a SQL NBP for URLs that correlate to the SQL template; and
  for HTTP request with a correlated URL,
    matching between parameters of the HTTP request and literals of the SQL query;
    computing a matching score for each HTTP request;
    selecting the HTTP request with the highest correlate score; and
    binding the web context web application context of the selected HTTP request to the incoming SQL query.

18. The computer program product of claim 17, wherein the web application context includes at least one of: a session identifier (sessionID), and a user identity.

19. An application level security system for real-time correlating between requests to a web server and requests to a database server, the security system comprises:
  a first sensor adapted to capture the requests to the web server;
  a second sensor adapted to capture the requests to the database server; and
  a secure server adapted to correlate the requests based on inputs from the first sensor and the second sensor, wherein the security system is being further capable of binding a web application context to each request to a database;
  wherein requests to web servers are hypertext transfer protocol (HTTP) requests and wherein requests to database server are structured query language (SQL) queries;
  wherein correlating the request comprises identifying correlated pairs of SQL templates and uniform resource locators (URLs);
  wherein binding the web application to the SQL query, further comprises;
    receiving a SQL query from the first sensor;
    converting the SQL query to a SQL template;
    searching in the SQL NBP for URLs that correlate to the SQL template;
    for each HTTP request with a correlated URL:
      matching between parameters of the HTTP request and literals of the SQL query;
      computing a matching score for each HTTP request;
      selecting the HTTP request with the highest correlate score; and
      binding the web application context of the selected HTTP request to the incoming SQL query.

20. The system of claim 19, wherein the first sensor is a SQL sensor.

21. The system of claim 20, wherein the first sensor includes a SQL normal behavior profiles (NBP).

22. The system of claim 19, wherein the second sensor is a HTTP sensor.

23. The system of claim 22, wherein the second sensor includes a HTTP NBP.

24. The system of claim 19, wherein the web application context includes at least one of a session identifier (ID), a user identity.

25. The system of claim 19, wherein converting the SQL query to the SQL template comprises:
  replacing each literal in the SQL query with a place holder;
  removing comments in the SQL query; and
  removing white-space characters in the SQL query.

* * * * *